(12) United States Patent
Sakurada et al.

(10) Patent No.: US 11,179,701 B2
(45) Date of Patent: Nov. 23, 2021

(54) EXHAUST GAS PURIFYING CATALYST AND PRODUCTION METHOD THEREFOR, AND EXHAUST GAS PURIFICATION DEVICE USING SAME

(71) Applicant: CATALER CORPORATION, Kakegawa (JP)

(72) Inventors: Yu Sakurada, Kakegawa (JP); Takahiro Harada, Kakegawa (JP); Ryota Nakashima, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 539 days.

(21) Appl. No.: 16/086,869

(22) PCT Filed: Mar. 9, 2017

(86) PCT No.: PCT/JP2017/009583
§ 371 (c)(1),
(2) Date: Sep. 20, 2018

(87) PCT Pub. No.: WO2017/163916
PCT Pub. Date: Sep. 28, 2017

(65) Prior Publication Data
US 2019/0099715 A1   Apr. 4, 2019

(30) Foreign Application Priority Data

Mar. 25, 2016   (JP) .............................. JP2016-062634

(51) Int. Cl.
*B01J 23/63*   (2006.01)
*B01J 37/04*   (2006.01)
(Continued)

(52) U.S. Cl.
CPC .............. *B01J 23/63* (2013.01); *B01D 53/94* (2013.01); *B01J 35/0006* (2013.01);
(Continued)

(58) Field of Classification Search
CPC ...... B01J 23/63; B01J 35/0006; B01J 35/006; B01J 35/0073; B01J 37/04; B01J 37/08; B01D 53/94
See application file for complete search history.

(56) References Cited

U.S. PATENT DOCUMENTS

2003/0039597 A1   2/2003   Deeba et al.
2009/0099011 A1   4/2009   Miura
(Continued)

FOREIGN PATENT DOCUMENTS

CN   102470349 A   5/2012
CN   102905776 A   1/2013
(Continued)

OTHER PUBLICATIONS

Aug. 21, 2020 Office Action issued in Chinese Patent Application No. 201780019862.0.
(Continued)

*Primary Examiner* — James A Fiorito
(74) *Attorney, Agent, or Firm* — Oliff PLC

(57) ABSTRACT

An exhaust gas purifying catalyst having first carrier particles, second carrier particles, and precious metal catalyst particles supported on the first and second carrier particles, wherein: the first carrier particles contain ceria, zirconia, and a rare-earth oxide other than ceria; the second carrier particles contain a rare-earth oxide other than ceria, and may contain ceria and zirconia; the contained proportion of ceria and zirconia in the first carrier particles is higher than the contained proportion of ceria and zirconia in the second carrier particles; the contained proportion of the rare-earth oxide in the second carrier particles is higher than the contained proportion of the rare-earth oxide in the first carrier particles; and the contained proportion of ceria in the
(Continued)

(a)

(b)

first carrier particles is 45 wt % or less, while the precious metal catalyst particles include rhodium particles.

15 Claims, 3 Drawing Sheets

(51) Int. Cl.
  *B01J 37/08* (2006.01)
  *B01J 35/00* (2006.01)
  *B01D 53/94* (2006.01)
  *F01N 3/20* (2006.01)

(52) U.S. Cl.
  CPC ......... *B01J 35/006* (2013.01); *B01J 35/0073* (2013.01); *B01J 37/04* (2013.01); *B01J 37/08* (2013.01); *F01N 3/20* (2013.01)

(56) References Cited

U.S. PATENT DOCUMENTS

| | | | |
|---|---|---|---|
| 2010/0056368 A1 | 3/2010 | Takeshima et al. | |
| 2011/0045968 A1* | 2/2011 | Akamine | B01J 37/0036 502/303 |
| 2011/0047975 A1 | 3/2011 | Nakayama et al. | |
| 2012/0122672 A1 | 5/2012 | Matsueda et al. | |
| 2012/0128557 A1 | 5/2012 | Nunan et al. | |
| 2014/0369912 A1 | 12/2014 | Zheng et al. | |

FOREIGN PATENT DOCUMENTS

| | | |
|---|---|---|
| CN | 105307769 A | 2/2016 |
| EP | 3369481 A1 | 9/2018 |
| JP | 2002-518171 A | 6/2002 |
| JP | 2004-275919 A | 10/2004 |
| JP | 2005-058972 A | 3/2005 |
| JP | 2006-346661 A | 12/2006 |
| JP | 2008-018323 A | 1/2008 |
| JP | 2008-104928 A | 5/2008 |
| JP | 2011-62683 A | 3/2011 |
| JP | 2011-183317 A | 9/2011 |
| JP | 2013-117190 A | 6/2013 |
| JP | 5322526 B2 | 10/2013 |
| JP | 2015-085241 A | 5/2015 |
| JP | 2015-525123 A | 9/2015 |
| WO | 99/67020 A1 | 12/1999 |
| WO | 2011/010700 A1 | 1/2011 |
| WO | 2011/080567 A1 | 7/2011 |
| WO | 2013/182303 A1 | 12/2013 |
| WO | 2017/073527 A1 | 5/2017 |

OTHER PUBLICATIONS

"Suppression of Exhaust Gas of Internal Combustion Engine". Jan. 31, 2003, pp. 157.

Oct. 28, 2019 Search Report issued in European Patent Application No. 17769960.0.

Jun. 13, 2017 International Search Report issued in International Patent Application No. PCT/JP2017/009583.

* cited by examiner

EXHAUST GAS PURIFYING CATALYST AND PRODUCTION METHOD THEREFOR, AND EXHAUST GAS PURIFICATION DEVICE USING SAME

FIELD

The present invention relates to a novel exhaust gas purifying catalyst, a method for producing the same, and an exhaust gas purification device using the same.

BACKGROUND

Exhaust gas from an internal combustion engine, such as an automobile engine, contains nitrogen oxides ($NO_x$), carbon monoxide (CO) and hydrocarbons (HC). Thus, this exhaust gas is released into the atmosphere after having been purified by an exhaust gas purifying catalyst that oxidizes CO and HC and reduces $NO_x$. A typical known example of an exhaust gas purifying catalyst is a three-way catalyst in which a precious metal such as platinum (Pt), rhodium (Rh) or palladium (Pd) is supported on a porous metal oxide carrier such as γ-alumina.

Although this metal oxide carrier can be made with various materials, alumina ($Al_2O_3$) has typically been used in the past in order to obtain high surface area. More recently, however, various other materials such as ceria ($CeO_2$), zirconia ($ZrO_2$) or titania ($TiO_2$) have been proposed for use either alone or in combination with alumina in order to promote purification of exhaust gas using chemical properties of the carrier. In addition, ceria-zirconia solid solutions have also been proposed for use as such a carrier.

The heat resistance of ceria-zirconia solid solutions is known to be able to be improved by adding an element selected from the group consisting of alkaline metals, alkaline earth metals and rare earth elements to the ceria-zirconia solid solution (see, for example, Patent Document 1). In addition, Patent Document 2 discloses the obtaining of favorable exhaust gas purification performance by supporting rhodium on zirconia carrier particles to which a rare earth element has been added.

Patent Document 3 and Patent Document 4 disclose carrier particles obtained by imparting a rare earth element-enriched area to ceria-zirconia solid solution particles. In the inventions described in Patent Document 3 and Patent Document 4, attention is focused on the affinity between a rare earth oxide and rhodium, and the migration and sintering of rhodium on the particle surfaces are inhibited in the rare earth element-enriched area while preventing oxidation of rhodium, thereby maintaining the catalytic activity of the rhodium at a high level.

Patent Document 5 maintains the catalytic activity of rhodium at a high level by preventing oxidation of the rhodium by lowering the ceria content in the ceria-zirconia solid solution supporting the rhodium. Namely, although ceria, which has an oxygen storage and release capability (OSC material), releases oxygen in a reducing atmosphere (so-called rich atmosphere), it becomes difficult for the reduction of rhodium to proceed due to the effect of the oxygen released by the ceria. In Patent Document 5, reduction of rhodium is promoted by lowering the content of ceria to decrease the release of oxygen in a reducing atmosphere.

However, metal oxide carriers as described above have conventionally been formed on substrates not having the ability to purify exhaust gas per se, such as a honeycomb substrate made of cordierite. However, an exhaust gas purification device has recently been proposed in which a precious metal is supported on substrate composed of a metal oxide carrier (Patent Document 6).

CITATION LIST

Patent Literature

[Patent Document 1] JP2004-275919A
[Patent Document 2] JP2002-518171T
[Patent Document 3] JP2008-018323A
[Patent Document 4] JP2008-104928A
[Patent Document 5] JP5322256B
[Patent Document 6] JP2015-085241A

SUMMARY

Technical Problem

An object of the present invention is to provide a novel exhaust gas purifying catalyst, which is capable of maintaining the catalytic activity of rhodium at a high level, a method for producing the same, and an exhaust gas purification device that uses the same.

Solution to Problem

Examples of embodiments of the present invention include the aspects indicated below.

<Aspect 1>

An exhaust gas purifying catalyst having a first carrier particle, a second carrier particle, and a precious metal catalyst particle supported on the first carrier particle and the second carrier particle; wherein, the first carrier particle contains ceria, zirconia and a rare earth oxide other than ceria, the second carrier particle contains a rare earth oxide other than ceria and optionally contains ceria and zirconia, the total content of ceria and zirconia of the first carrier particle is higher than the total content of ceria and zirconia of the second carrier particle, the content of the rare earth oxide of the second carrier particle is higher than the content of the rare earth oxide of the first carrier particle, the content of ceria of the first carrier particle is 45% by weight or less, and the precious metal catalyst particle comprises a rhodium particle.

<Aspect 2>

The exhaust gas purifying catalyst according to Aspect 1, wherein the content of the rare earth oxide of the first carrier particle is less than 20% by weight, and the content of the rare earth oxide of the second carrier particle is 20% by weight or more.

<Aspect 3>

The exhaust gas purifying catalyst according to Aspect 2, wherein, in the case of observing the first carrier particle and the second carrier particle with a scanning transmission electron microscope, the ratio of the projected area of the second carrier particle to the projected area of the first carrier particle (area of second carrier particle/area of first carrier particle) is within the range of 0.050 to 0.100.

<Aspect 4>

The exhaust gas purifying catalyst according to any one of Aspects 1 to 3, wherein the first carrier particle and the second carrier particle are ceria-zirconia solid solutions containing a rare earth oxide other than ceria, and the rare earth oxide of the first carrier particle and the rare earth oxide of the second carrier particle are oxides of at least one rare earth element selected from the group consisting of yttrium, lanthanum, praseodymium, neodymium and samarium.

<Aspect 5>

The exhaust gas purifying catalyst according to Aspect 4, wherein the first carrier particle contains 50% by weight to 95% by weight of zirconia, 3.0% by weight or more of ceria and 1.0% by weight to less than 20% by weight of a rare earth oxide other than ceria, and the second carrier particle contains 0.0% by weight to 40% by weight of zirconia, 0.0% by weight to 40% by weight of ceria, and 20% by weight to 60% by weight of a rare earth oxide other than ceria.

<Aspect 6>

The exhaust gas purifying catalyst according to Aspect 5, wherein the first carrier particle contains 50% by weight to 75% by weight of zirconia, 20% by weight to 40% by weight of ceria and 1.0% by weight to less than 20% by weight of a rare earth oxide other than ceria, and the second carrier particle contains 0.0% by weight to 40% by weight of zirconia, 25% by weight to 40% by weight of ceria, and 20% by weight to 60% by weight of a rare earth oxide other than ceria.

<Aspect 7>

The exhaust gas purifying catalyst according to any one of Aspects 1 to 6, wherein the mean particle diameters of the first carrier particle and the second carrier particle as measured with a scanning transmission electron microscope are 0.50 μm to 100 μm and 0.50 μm to 5 μm, respectively.

<Aspect 8>

The exhaust gas purifying catalyst according to any one of Aspects 1 to 7, wherein the precious metal catalyst particle further contains platinum particles and/or palladium particles.

<Aspect 9>

The exhaust gas purifying catalyst according to any one of Aspects 1 to 8, wherein the locations of the rhodium particle and the locations of the second carrier particle coincide at a correlation coefficient of 65.0% or more when element mapping has been carried out by energy dispersive X-ray analysis using a scanning transmission electron microscope, the correlation coefficient being calculated according to the following formula:

$$\frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%)$$ [Math. 1]

(wherein, $x_i$ represents the characteristic X-ray intensity of a precious metal element at location i, $x_{av}$ represents the average value of the characteristic X-ray intensity of the precious metal element, $y_i$ represents the characteristics X-ray intensity of a rare earth metal element at location i, and $y_{av}$ represents the average value of the characteristic X-ray intensity of the rare earth metal element).

<Aspect 10>

An exhaust gas purification device provided with a catalyst layer containing the exhaust gas purifying catalyst according to any one of Aspects 1 to 9 and a substrate.

<Aspect 11>

The exhaust gas purification device according to Aspect 10, wherein the catalyst layer contains and upper layer, composing at least a portion of the uppermost layer, and a lower layer, and the upper layer contains the exhaust gas purifying catalyst.

<Aspect 12>

An exhaust gas purification device provided with a substrate containing the exhaust gas purifying catalyst according to any one of Aspects 1 to 9.

<Aspect 13>

A method for producing an exhaust gas purifying catalyst, comprising the followings: mixing an aqueous dispersion of a carrier particle, containing ceria, zirconia and a rare earth oxide other than ceria; an aqueous solution containing a salt of a catalyst precious metal comprising a rhodium; and an organic carboxylic acid, and supporting the catalyst precious metal on the carrier particle to obtain an aqueous dispersion containing an unfired exhaust gas purifying catalyst and, drying and firing the aqueous dispersion containing the unfired exhaust gas purifying catalyst.

<Aspect 14>

The method according to Aspect 13, wherein the metal oxide of the carrier particle is a ceria-zirconia solid solution, the rare earth oxide of the carrier particle is an oxide of at least one rare earth element selected from the group consisting of yttrium, lanthanum, praseodymium, neodymium and samarium, and the salt of the catalyst precious metal is a nitrate or sulfate of platinum, palladium, rhodium or a combination thereof.

<Aspect 15>

The method according to Aspect 13 or 14, wherein the organic carboxylic acid is an organic carboxylic acid having a molecular weight of 300 or less.

<Aspect 16>

The method according to any one of Aspects 13 to 15, wherein the molar ratio of the number of moles of the organic carboxylic acid to the total number of moles of rare earth element contained in the carrier particle (mol/mol-Ln) is 0.5 to 3.5.

Advantageous Effects of Invention

According to the present invention, a novel exhaust gas purifying catalyst, which is capable of maintaining the catalytic activity of a precious metal of rhodium at a high level, a method for producing the same, and an exhaust gas purification device that uses the same, can be provided.

BRIEF DESCRIPTION OF DRAWINGS

FIG. 1(a) is a conceptual diagram of an exhaust gas purifying catalyst of the prior art, while FIG. 1(b) is a conceptual diagram of the exhaust gas purifying catalyst of the present invention.

DESCRIPTION OF EMBODIMENTS

<<Exhaust Gas Purifying Catalyst>>

The exhaust gas purifying catalyst of the present invention has a first carrier particle, a second carrier particle and a precious metal catalyst particle supported on the first and second carrier particles. The first carrier particle contains ceria, zirconia and a rare earth oxide other than ceria, while the second carrier particle contains a rare earth oxide other than ceria and optionally contains ceria and zirconia. The total content of ceria and zirconia of the first carrier particle is higher than the total content of ceria and zirconia of the second carrier particle, and the content of the rare earth oxide of the second carrier particle is higher than the content of the rare earth oxide of the first carrier particle. In addition, the content of ceria of the first carrier particle is 45% by weight or less, and the precious metal catalyst particle comprises a rhodium particle.

Furthermore, in the present description, a "catalyst" refers to carrier particles supporting precious metal catalyst particles unless specifically indicated otherwise, and these carrier particles may be fired or left unfired.

In the prior art, catalytic activity was maintained at a high level by imparting a rare earth element-enriched area to the surface of a metal oxide carrier, and inhibiting migration and sintering of rhodium particles in the rare earth element-enriched area while preventing oxidation of rhodium particles. Further, when using a combination of ceria-zirconia solid solution and rhodium, the ceria content was lowered to maintain the reduction status of rhodium. In contrast, in the present invention, an even higher level of activity was able to be imparted to rhodium by combining the use of a second support having a high rare earth oxide content with an ordinary metal oxide carrier. Without being bound by theory, in the present invention, catalytic activity is thought to have been able to be made even higher as a result of rhodium being intensively supported on a second carrier having a high rare earth oxide content.

According to this catalyst of the present invention, a carrier having a ceria content higher than that of the prior art can be used in the case of using a carrier containing ceria and zirconia. Since a carrier having a high ceria content demonstrates high oxygen storage and release capacity, in the case of using a carrier having a high ceria content in the catalyst of the present invention, both lowering of restart NOx emission levels and lowering of high space velocity (SV) NOx levels can be realized in particular. Namely, it is difficult to realize an improvement in restart NOx exhaust levels after discontinuing idling when the air-fuel ratio changes from lean to rich in combination with a considerable improvement in high SV NOx exhaust levels when air intake volume is large due to the trade-off relationship that exists between the two. However, it is possible to realize both of these improvements by using a carrier having a high ceria content.

Figure 1:
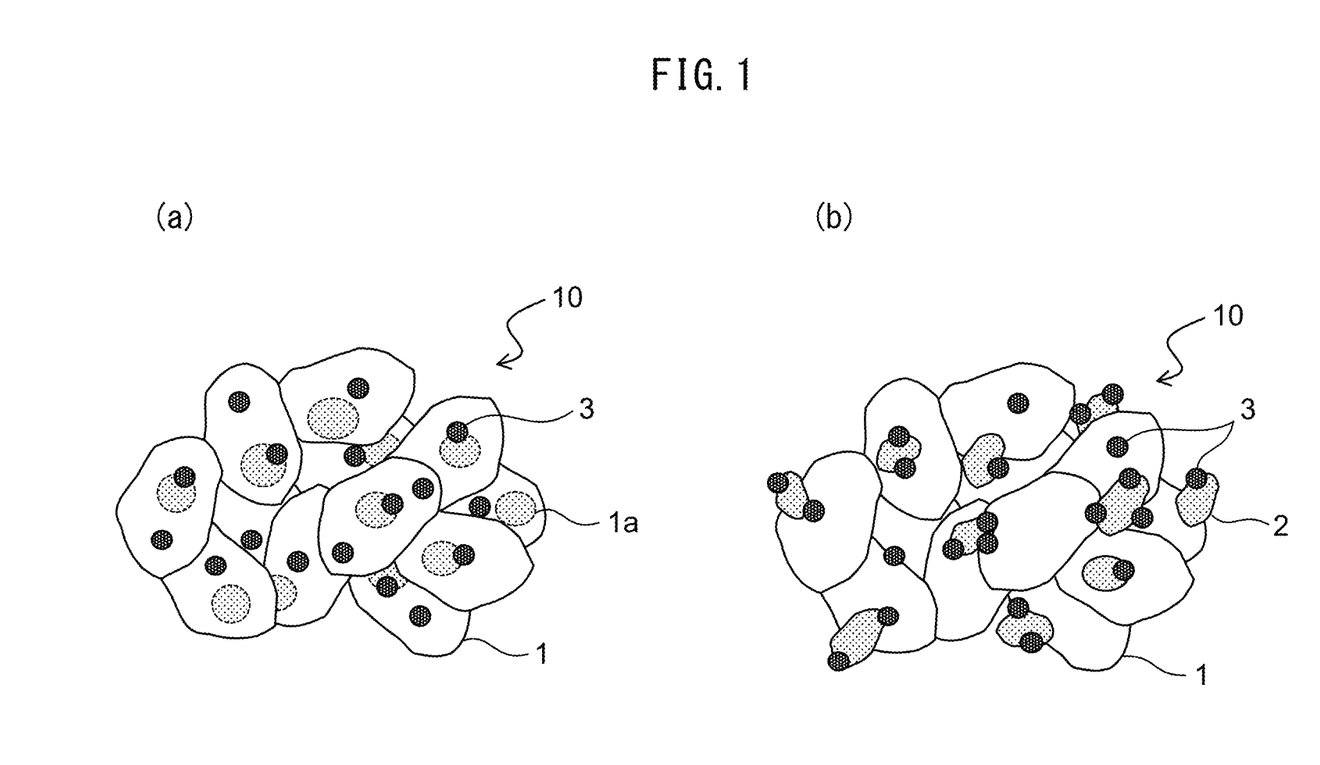

FIG. 1(a) is a conceptual diagram of an exhaust gas purifying catalyst of the prior art, while FIG. 1(b) is a conceptual diagram of the exhaust gas purifying catalyst of the present invention. In FIG. 1(a), an exhaust gas purification catalyst (10) has metal oxide carrier particles (1) and rhodium particles (3), and rare earth element-enriched areas (1a) are present in the metal oxide particles (1). In FIG. 1(b), the exhaust gas purification catalyst (10) has first carrier particles (1) containing ceria and zirconia, second carrier particles (2) having a high rare earth oxide content, and rhodium particles (3), and many of the rhodium particles (3) are supported on the second carrier particles (2).

(Carrier Particles)

At least one first carrier particle and second carrier particle are used to support the rhodium particles in the exhaust gas purifying catalyst of the present invention. A third carrier particle other than the first carrier particle and the second carrier particle can also be used.

For example, in the case of defining the first carrier particle as a particle in which the content of rare earth oxide other than ceria is less than 20% by weight, defining the second carrier particle as a particle in which the content of rare earth oxide other than ceria is 20% by weight or more, and observing the first carrier particle and the second carrier particle with a scanning transmission electron microscope, the ratio of the projected area of the second carrier particle to the projected area of the first carrier particle contained in the exhaust gas purifying catalyst of the present invention (area of second carrier particle/area of first carrier particle) may be 0.005 or more, 0.01 or more, 0.03 or more, 0.05 or more or 0.06 or more, and 0.30 or less, 0.25 or less, 0.20 or less, 0.15 or less, 0.10 or less or 0.08 or less. If the aforementioned ratio is within this range, the rhodium particle can be intensively supported on the second carrier particle, sintering of the rhodium particle can be substantially prevented, and increases in $NO_x$ purification temperature tend to be prevented. Furthermore, the aforementioned projected area ratio can be made to be within the same range even in the case the aforementioned definitions of the first carrier particle and second carrier particle have been changed.

(Carrier Particles—First Carrier Particle)

The first carrier particle used in the exhaust gas purifying catalyst of the present invention contains ceria, zirconia and a rare earth oxide other than ceria.

For example, in the case of defining the first carrier particle as a particle in which the content of rare earth oxide other than ceria is less than 20% by weight, and defining the second carrier particle as a particle in which the content of rare earth oxide other than ceria is 20% by weight or more, the mean particle diameter of the first carrier particle may be 0.50 μm or more, 1.0 μm or more, 3.0 μm or more, 5.0 μm or more, 8.0 μm or more or 10.0 μm or more, and 100 μm or less, 80 μm or less, 50 μm or less, 30 μm or less or 20 μm or less. The mean particle diameter of the first carrier particle can be made to be within the same range even in the case the aforementioned definitions of the first carrier particle and second carrier particle have been changed.

Measurement of mean particle diameter is carried out with the Tecnai Osiras scanning transmission electron microscope manufactured by FEI Company Japan Ltd. and an energy dispersive X-ray analyzer provided with that device. Namely, the first carrier particles can be located by energy dispersive X-ray analysis from among particles having an equivalent diameter of 0.10 μm or more on a screen projected at a measurement magnification factor of 20,000× by this device. The equivalent diameter of these particles is then calculated from the projected area of the particles. This process is then carried out on 20 arbitrary screens, and the mean value of all particles is recognized as the mean particle diameter of the first carrier particles. Incidentally, the equivalent diameter of a particle refers to the diameter of a perfect circle having an outer circumferential length equal to the outer circumferential length of the particle.

The first carrier particle contains ceria and zirconia, and the content thereof based on the weight of the first carrier particle may be 50% by weight or more, 55% by weight or more, 60% by weight or more, 65% by weight or more or 70% by weight or more, and 95% by weight or less, 90% by weight or less, 85% by weight or less or 80% by weight or less.

The total content of ceria and rare earth oxide other than ceria of the first carrier particle based on the weight of the first carrier particle may be 5.0% by weight or more, 10% by weight or more, 15% by weight or more, 20% by weight or more or 25% by weight or more, and 50% by weight or less, 45% by weight or less, 40% by weight or less or 35% by weight or less.

The ceria content of the first carrier particle may be 5.0% by weight or more, 10% by weight or more, 15% by weight or more, 20% by weight or more, more than 20% by weight, 25% by weight or more, or 30% by weight or more, and 50% by weight or less, less than 50% by weight, 45% by weight or less, 40% by weight or less, or 35% by weight or less. Moreover, the content of rare earth oxide other than ceria may be 1.0% by weight or more, 3.0% by weight or more, 5.0% by weight or more or 7.0% by weight or more, and 30% by weight or less, 25% by weight or less, 20% by weight or less, less than 20% by weight, 15% by weight or less or 10% by weight or less.

The first carrier particle preferably contains a ceria-zirconia solid solution. In this case, the zirconia content of the first carrier particle may be 40% by weight or more, 45% by weight or more, 50% by weight or more, 55% by weight or more, 60% by weight or more, 65% by weight or more or 70% by weight or more, and 95% by weight or less, 90% by weight or less, 85% by weight or less or 80% by weight or less. In addition, in this case, the ceria content of the first carrier particle may be 3.0% by weight or more, 5.0% by weight or more, 10% by weight or more, 15% by weight or more, 20% by weight or more or 25% by weight or more, and 50% by weight or less, 45% by weight or less, 40% by weight or less or 35% by weight or less. Incidentally, these contents can be determined by calculating from the results of elemental analysis.

Examples of the rare earth oxide of the first carrier particle include rare earth elements having a low atomic number that form ions having one or a large number of vacant 4f electron orbitals, such as oxides of rare earth elements selected from the group consisting of yttrium (Y), lanthanum (La), praseodymium (Pr), neodymium (Nd) and samarium (Sm).

The first carrier particle optionally contains a component other than those described above, and for example, optionally contains alumina, silica, titania, barium oxide, strontium oxide, etc.

The first carrier particle can be produced by a known method described in the aforementioned patent literature.

(Carrier Particles—Second Carrier Particle)

The second carrier particle used in the exhaust gas purifying catalyst of the present invention contains a rare earth oxide other than ceria and optionally contains ceria and zirconia. In addition, the content of ceria and zirconia of the second carrier particle is lower than the content of ceria and zirconia of the first carrier particle, and the content of rare earth content oxide other than ceria of the second carrier particle is higher than the content of rare earth content oxide other than ceria of the first carrier particle. As a result, rhodium particles can be intensively supported on the second carrier particle.

For example, in the case of defining the first carrier particle as a particle in which the content of rare earth oxide other than ceria is less than 20% by weight, and defining the second carrier particle as a particle in which the content of rare earth oxide other than ceria is 20% by weight or more, the mean particle diameter of the second carrier particle may be 0.50 µm or more, 1.0 µm or more, 2.0 µm or more or 3.0 µm or more, and 50 µm or less, 20 µm or less, 15 or less, 10 µm or less or 5.0 µm or less. If mean particle diameter is within this range, rhodium particles can be intensively supported on the second carrier particle, sintering of the rhodium particles can be substantially prevented, and increases in NOx purification temperature tend to be prevented. The mean particle diameter of the second carrier particle can be made to be within the same range even in the case the aforementioned definitions of the first carrier particle and second carrier particle have been changed. This mean particle diameter is measured according to the same method as that used to measure mean particle diameter of the first carrier particle as previously described.

The second carrier particle contains a rare earth oxide other than ceria, and the content thereof may be 10% by weight or more, 15% by weight or more, 20% by weight or more, 25% by weight or more or 30% by weight or more, and 100% by weight or less, 80% by weight or less, 60% by weight or less, 55% by weight or less, 50% by weight or less, 45% by weight or less or 40% by weight or less. If the second carrier particle contains ceria and/or zirconia, the content thereof based on the weight of the second carrier particle may be 1.0% by weight or more, 2.0% by weight or more, 3.0% by weight or more, 5.0% by weight or more, 10% by weight or more or 15% by weight or more, and 40% by weight or less, 35% by weight or less, 30% by weight or less or 25% by weight or less.

The content of ceria and a rare earth oxide other than ceria based on the weight of the second carrier particle may be 60% by weight or more, 65% by weight or more, 70% by weight or more, 75% by weight or more or 80% by weight or more, and 99% by weight or less, 95% by weight or less, 93% by weight or less or 90% by weight or less.

In the case the second carrier particle contains ceria, the content thereof may be 20% by weight or more, 25% by weight or more, 30% by weight or more, 35% by weight or more or 40% by weight or more, and 70% by weight or less, 65% by weight or less, 60% by weight or less, 55% by weight or less, 50% by weight or less, 45% by weight or less or 40% by weight or less.

The same type of rare earth oxide as the rare earth oxide contained in the first carrier particle can be used for the rare earth oxide of the second carrier particle.

The second carrier particle optionally contains a third component other than the components as previously described in the same manner as the first carrier particle, and for example, alumina, silica, titania, barium oxide, strontium oxide, etc., may be contained.

The second carrier particle can be produced by a known method described in the aforementioned patent literature. However, the second carrier particle is preferably obtained by adding carrier particles to an organic carboxylic acid solution and then eluting from the carrier particles as will be subsequently described in detail.

(Precious Metal Catalyst Particle)

Rhodium particle is used in the exhaust gas purifying catalyst of the present invention. In addition, the exhaust gas purifying catalyst of the present invention may contain precious metal particle other than rhodium particle, including platinum group metals, preferably platinum particle and/or palladium particle.

The rhodium particle preferably has a sufficiently small particle diameter from the viewpoint of enhancing contact area with exhaust gas. The mean particle diameter of the rhodium particle as the mean value of the equivalent diameter determined by TEM observation may typically be about 1 nm to 20 nm, 10 nm or less, 7 nm or less or 5 nm or less.

The rhodium particle may be supported at a total of 0.1 parts by weight or more, 0.3 parts by weight or more, 0.5 parts by weight or more or 1.0 parts by weight or more, and 10 parts by weight or less, 5 parts by weight or less, 3.0 parts by weight or less or 2.0 parts by weight or less based on a total of 100 parts by weight of the first carrier particle and second carrier particle.

The content of rhodium particle relative to the total content of the precious metal particle may be 10% by weight or more, 20% by weight or more, 30% by weight or more, 50% by weight or more, 70% by weight or more, 80% by weight or more or 90% by weight or more, and 100% by weight or less, 90% by weight or less, 80% by weight or less, 60% by weight or less, 50% by weight or less, 30% by weight or less or 20% by weight or less.

The rhodium particle used in the exhaust gas purifying catalyst of the present invention is preferably mainly supported on the aforementioned second carrier particle. Namely, in the case of having carried out the aforementioned element mapping by energy dispersive X-ray analysis using a scanning transmission electron microscope, the locations of the rhodium particle and the locations of the second carrier particle preferably coincide at a correlation coefficient of 65% or more, 70.0% or more or 75.0% or more. The correlation coefficient is calculated in the following manner:

$$\frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%) \quad [\text{Math. 2}]$$

(wherein, $x_i$ represents the characteristic X-ray intensity of a precious metal element at location i, $x_{av}$ represents the average value of the characteristic X-ray intensity of the precious metal element, $y_i$ represents the characteristics X-ray intensity of a rare earth metal element at location i, and $y_{av}$ represents the average value of the characteristic X-ray intensity of the rare earth metal element).

This measurement was carried out with the Tecnai Osiras scanning transmission electron microscope manufactured by FEI Company Japan Ltd. and an energy dispersive X-ray analyzer provided with that device. More specifically, the aforementioned calculation was carried out by analyzing the center of gravity of a rhodium particle i in a plurality of images at a magnification factor of 20,000× as measured with this scanning transmission electron microscope and measuring the spectral intensity value of the rhodium particle i at the location of that center of gravity and spectral intensity value of a rare earth element other than cerium at the location of that center of gravity. In the case there are a plurality of types of rare earth elements other than cerium, the intensities thereof are added. Furthermore, "average spectral intensity value" refers to the average value of the total characteristic X-ray intensities of rhodium contained in rhodium particles or of rare earth elements other than cerium contained in the second carrier able to be visualized in the same or different fields. In the case of carrying out the aforementioned calculation, preferably 300 particles or more of each of the second carrier and rhodium particles are used.

The aforementioned correlation coefficient normally does not change substantially before and after firing of the catalyst, and preferably does not change.

<<Exhaust Gas Purification Device>>

In one embodiment of the present invention, the exhaust gas purification device is provided with a catalyst layer containing the aforementioned exhaust gas purifying catalyst and a substrate having the catalyst layer. In another embodiment of the present invention, the exhaust gas purification device is provided with a substrate containing the exhaust gas purifying catalyst. The exhaust gas purifying catalyst may be an exhaust gas purifying catalyst obtained according to the method for producing the exhaust gas purifying catalyst of the present invention to be subsequently described.

The catalyst layer may consist of a plurality of layers. In addition, in the case the catalyst layer consists of a plurality of layers, the aforementioned exhaust gas purifying catalyst is contained in at least one of those layers. However, the aforementioned exhaust gas purifying catalyst is preferably contained in the layer serving as the uppermost layer of the catalyst layer. In the case the aforementioned exhaust gas purifying catalyst is not contained in one of the catalyst layers, that catalyst layer may use a catalyst containing an element described as a constituent element of the aforementioned exhaust gas purifying catalyst, such as a catalyst not containing the second carrier particle of the aforementioned exhaust gas purifying catalyst.

In the case the catalyst layer is composed of a plurality of layers, the catalyst layer may have an upper layer composing at least a portion of the uppermost surface and a lower layer on the substrate. The catalyst layer may also have an intermediate layer between the upper layer and lower layer. The intermediate layer is a layer located between the upper layer and substrate of the exhaust gas purification device of the present invention and may be formed from a plurality of layers. The lower layer may contain the aforementioned exhaust gas purifying catalyst or may contain a catalyst containing an element described as a constituent element of the aforementioned exhaust gas purifying catalyst, such as a catalyst not containing the second catalyst particle of the aforementioned exhaust gas purifying catalyst.

The catalyst layer may be formed from a mixture of the aforementioned exhaust gas purifying catalyst and other components. Examples of other components used here include alumina, Ceria-Zirconia, zeolite and mixtures thereof. A known exhaust gas purifying catalyst having a precious metal supported thereon may also be used as another component. The catalyst layer may be formed on a substrate containing catalyst carrier particles in the walls thereof, such as a substrate like that described in JP2015-85241A.

Examples of substrates include straight flow-type and wall flow-type honeycomb substrates commonly used in exhaust gas purification devices. There are no particular limitations on the material of the substrate and examples thereof include ceramic, silicon carbide and metal substrates.

Figure 2:
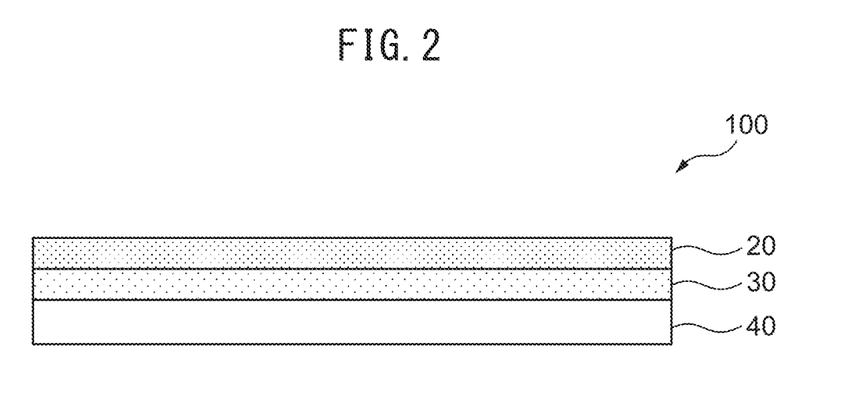
FIG. 2 is a conceptual diagram of a layer structure of the exhaust gas purifying catalyst according to one embodiment of the present invention.
Figure 3:
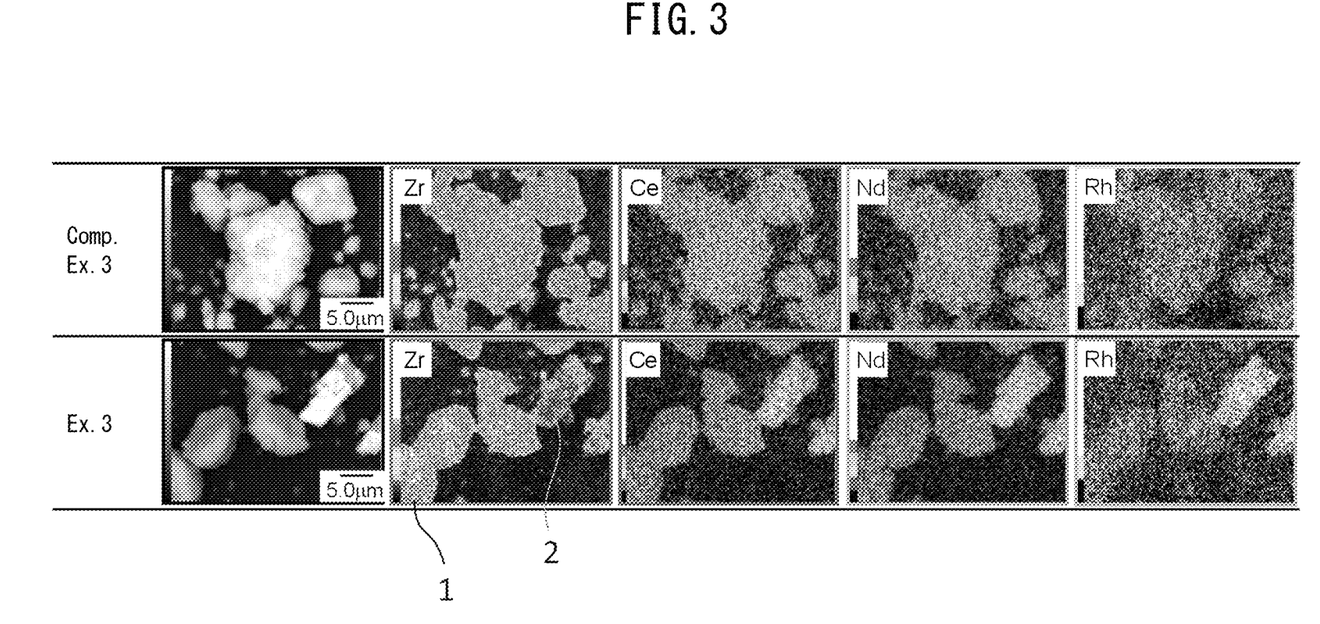
FIG. 3 shows the element mapping by energy dispersive X-ray analysis using a scanning transmission electron microscope carried out on exhaust gas purifying catalysts of Example 3 and Comparative Example 3.

FIG. 2 is a conceptual diagram of a layer structure of the exhaust gas purification device of the present invention, and this exhaust gas purification device (100) has an upper layer (20) and a lower layer (30) exposed on the surface thereof on a substrate (40).

Production of other components, mixing of other components with the exhaust gas purifying catalyst of the present invention and formation of a catalyst layer on the aforementioned substrate can each be carried out according to a known method or a method that has been suitably modified by a person with ordinary skill in the art.

In the case the exhaust gas purifying catalyst is contained in the substrate, a substrate containing catalyst carrier particles in the walls thereof, such as a substrate like that described in JP2015-85241A, can be used. In this case, the exhaust gas purification device may be obtained by mixing the exhaust gas purifying catalyst with other inorganic particles used when producing the substrate.

Since the exhaust gas purification device of the present invention produced in the above manner is able to demonstrate a high level of precious metal exhaust gas purification activity and maintain that activity at a high level, it can be preferably used as, for example, a dedicated automobile exhaust gas purifying catalyst.

<<Method for Producing Exhaust Gas Purifying Catalyst>>

The method of the present invention for producing an exhaust gas purifying catalyst comprises a step of mixing an aqueous dispersion of a carrier particle, containing ceria, zirconia and a rare earth oxide other than ceria; an aqueous solution containing a salt of rhodium; and an organic carboxylic acid, and supporting the rhodium on the carrier particle to obtain an aqueous dispersion containing an unfired exhaust gas purifying catalyst and, a step of drying and firing the aqueous dispersion containing the unfired exhaust gas purifying catalyst.

According to this method, rare earth oxide is eluted from the carrier particle by an organic carboxylic acid to obtain a second carrier particle enriched with the rare earth oxide and a first carrier particle enriched with ceria and zirconia, in particular zirconia. In this case, the rhodium is mainly supported on the second carrier particle enriched with the rare earth oxide, and since sintering and oxidation of the precious metal serving as catalyst can be prevented as a result thereof, a preferable exhaust gas purifying catalyst can be obtained that is capable of maintaining catalytic activity of the rhodium at a high level. In the case the starting substance in the form of the carrier particle contains a ceria-zirconia solid solution, the rare earth oxide not in solid solution is more easily eluted by the organic carboxylic acid, thereby making this aspect particularly preferable.

Moreover, it was surprisingly found that rhodium particles of an exhaust gas purification catalyst obtained according to this method have a smaller diameter in comparison with that in the case of conventional methods in which an organic carboxylic acid is not added. Without being bound by theory, this is thought to be due to the formation of a rare earth organic carboxylate following the addition of organic carboxylic acid, the rhodium selectively adsorbing to the rare earth organic carboxylate, and rhodium being immobilized due to interaction between the rare earth element and rhodium after firing. As the particle diameter of the rhodium particle becomes smaller, the surface area of the rhodium particle per unit weight becomes larger and the number of catalyst reactive sites increases, thereby making this extremely advantageous.

The exhaust gas purifying catalyst of the present invention in particular can be produced according to the method of the present invention for producing an exhaust gas purifying catalyst. Thus, the particle diameter of the carrier particles, the added amounts of zirconia, ceria and rare earth oxide other than ceria in the carrier particles, the type and added amount of rare earth oxide other than ceria, and the type and added amount of precious metal used in the method of the present invention can be selected with reference to the previously described description of the exhaust gas purifying catalyst of the present invention.

For example, in the step for obtaining an aqueous dispersion containing an unfired exhaust gas purifying catalyst, the amount (reaction equivalence point) of organic carboxylic acid that is neither in excess or deficient relative to the amount of rare earth component other than cerium contained in the carrier particles is dissolved in an aqueous solution. A salt of rhodium is then mixed into the aqueous solution of the organic carboxylic acid followed by mixing the aqueous solution containing the organic carboxylic acid and rhodium with a dispersion having the carrier particles dispersed therein.

The amount of organic carboxylic acid used in the method of the present invention can be expressed as the molar ratio (mol/mol-Ln) of the number of moles of organic carboxylic acid added (mol) to the total number of moles of rare earth element contained in the carrier particles (mol-Ln). The molar ratio (mol/mol-Ln) may preferably be 0.5 or more, 1.0 or more or 1.5 or more, and 3.5 or less, 3.0 or less or 2.5 or less. If the molar ratio is within this range, the ceria and zirconia of the carrier particles is difficult to dissolve while the rare earth oxide dissolves easily, thereby facilitating formation of the second carrier particle.

The carrier particle may have the same composition as the first carrier particle used in the aforementioned exhaust gas purifying catalyst of the present invention.

In addition to the rhodium salt, a salt of a precious metal can be used. Examples of the salt of a precious metal include strong acid salts of the precious metal, and examples thereof particularly include nitrates and sulfates of precious metals. Examples of precious metals in addition to rhodium include platinum and/or palladium.

Examples of the organic carboxylic acid preferably include organic carboxylic acids having a molecular weight of 300 or less, examples of which include saturated fatty acids, unsaturated fatty acids, hydroxy acids, aromatic carboxylic acids, dicarboxylic acids, tricarboxylic acids and oxocarboxylic acids having 1 to 20 carbon atoms. Specific examples thereof include formic acid, acetic acid, propionic acid, butyric acid, tartaric acid, oxalic acid, malonic acid and succinic acid.

The added amount of organic carboxylic acid may be 0.50 times or more, 1.0 times or more or 2.0 times or more, and 5.0 times or less, 4.5 times or less, 4.0 times or less or 3.5 times or less the molar amount of the rare earth component, and preferably the rare earth component not in solid solution, contained in the carrier particles.

After obtaining the exhaust gas purifying catalyst of the present invention, the aqueous dispersion containing the same is dried and fired. The drying temperature may be, for example, 150° C. or higher, 200° C. or higher or 250° C. or higher, and 400° C. or lower, 350° C. or lower or 300° C. or lower. The drying time may be 16 hours or more, 12 hours or more or 8 hours or more, and 24 hours or less or 20 hours or less. In addition, the firing temperature may be 500° C. or higher, 550° C. or higher or 600° C. or higher, and 1000° C. or lower, 800° C. or lower or 700° C. or lower. The firing time may be 30 minutes or more, 1 hour or more, 2 hours or more or 4 hours or more, and 12 hours or less, 10 hours or less or 8 hours or less.

The exhaust gas purifying catalyst obtained in this manner can be further crushed to make the particle diameter of the carrier particles to be within the range of the particle diameter of the first carrier particle of the exhaust gas purifying catalyst of the present invention.

EXAMPLES

A. Reference Experiments of Various Exhaust Gas Purifying Catalysts

<<Sample Preparation>>

Example 1

Acetic acid in a molar amount that reacts neither in excess or deficiently relative to the sum of the rare earth element other than cerium contained in the carrier particles was dissolved in ion exchange water to prepare an aqueous acetic acid solution. Next, rhodium nitrate solution was added to the acetic acid solution so that the amount of rhodium was 0.50% by weight of the carrier particles to obtain an aqueous solution containing acetic acid and rhodium acetate. This solution was mixed with a dispersion obtained by dispersing carrier particles in ion exchange water. This mixture was then stirred, dried for 8 hours at 250° C., fired for 1 hour at 500° C. and then crushed to obtain the exhaust gas purifying catalyst of Example 1.

Examples 2 to 4 and Comparative Examples 1 to 3

Exhaust gas purifying catalysts of Examples 2 to 4 were obtained in the same manner as Example 1 with the exception of using other organic carboxylic acids instead of acetic acid. In addition, exhaust purifying catalysts of Comparative Examples 1 and 2 were obtained in the same manner as Example 1 with the exception of using other acids instead of an organic carboxylic acid. Moreover, the exhaust gas purifying catalyst of Comparative Example 3 was obtained in the same manner as Example 1 with the exception of not using acetic acid. Details of the compositions of these examples are shown in Table 1.

Examples 5 and 6 and Comparative Examples 4 and 5

Exhaust gas purifying catalyst of Examples 5 and 6 were obtained by changing the carrier particles and precious metal salt used in Example 2. In addition, exhaust gas purifying catalysts of Comparative Examples 4 and 5 were obtained in the same manner as Examples 5 and 6, respectively, with the exception of not using an organic carboxylic acid. The details of the compositions of these examples are shown in Table 2.

Examples 7 to 15

Exhaust gas purifying catalysts of Examples 7 to 15 were obtained by changing the composition of the carrier particles of Example 4 and changing the added amount of carboxylic acid. Details of the compositions of these examples are shown in Table 3.

Examples 16 to 19 and Comparative Examples 6 to 9

Exhaust gas purifying catalysts of Examples 16 to 19 and Comparative Examples 6 to 9 were obtained by changing the types of carrier particles used in Example 1. Details of the compositions of these examples are shown in Table 4.

<Exhaust Gas Purifying Catalysts after Durability Testing>

The exhaust gas purifying catalysts obtained in the manner described above were arranged in a flow through-type durability tester. After raising the internal temperature of the tester to 1000° C., a lean gas, obtained by adding oxygen to nitrogen gas at a concentration of 1%, and a rich gas, obtained by adding carbon monoxide to nitrogen gas at a concentration of 2%, were allowed to alternately flow through the tester for 10 hours in two minute cycles at a flow rate of 500 mL/min. The exhaust gas purifying catalysts were subsequently evaluated as exhaust gas purifying catalysts after durability testing.

<Fabrication of Exhaust Gas Purification Devices>

The exhaust gas purifying catalysts obtained in the manner described above were mixed with alumina powder at a weight ratio of 1:1 followed by dispersing in pure water at a solid content of 30% by weight to obtain slurries. The slurries were then coated onto a monolith honeycomb substrate (volume: 0.35 L) so that the amount of heavy metal was coated at 0.25 g/L. The coated monolith honeycomb substrates were dried for 10 minutes at 250° C. and then fired for 20 minutes at 500° C. to obtain exhaust gas purification devices.

<Exhaust Gas Purification Devices after Durability Testing>

The exhaust gas purification devices obtained in the manner described above were arranged in a flow through-type durability tester. After raising the internal temperature of the tester to 1000° C., a lean gas, obtained by adding oxygen to nitrogen gas at a concentration of 1%, and a rich gas, obtained by adding carbon monoxide to nitrogen gas at a concentration of 2%, were allowed to alternately flow through the tester in two minute cycles at a flow rate of 500 mL/min. The exhaust gas purification devices were subsequently evaluated as exhaust gas purification devices after durability testing.

<<Evaluation Methods>>

<Mean Particle Diameter and Abundance Ratio of Second Carrier>

Mean particle diameter of carrier particles of the exhaust gas purifying catalysts were measured with the Tecnai Osiras scanning transmission electron microscope manufactured by FEI Company Japan Ltd. and an energy dispersive X-ray analyzer provided with that device.

More specifically, particles containing 50% by weight to 95% by weight of zirconia and 5.0% by weight to 50% by weight of ceria and rare earth oxide other than ceria were located by energy dispersive X-ray analysis from among particles having an equivalent diameter of 0.10 µm or more on a screen projected at a measurement magnification factor of 20,000× by this device. These were recognized as first carrier particles. The equivalent diameter of these particles was then calculated from the projected area of the particles. This process was then carried out on 20 arbitrary screens, and the mean value of all particles was taken to be the mean particle diameter of the first carrier particles.

Moreover, particles containing 1.0% by weight to 40% by weight of zirconia and 60% by weight to 99% by weight of ceria and rare earth oxide other than ceria were located from among particles having an equivalent diameter of 0.10 µm or more, and these particles were recognized as second carrier particles. The equivalent diameter of these particles was then calculated from the projected area of the particles. This process was then carried out on 20 arbitrary screens, and the mean value of all particles was taken to be the mean particle diameter of the second carrier particles.

Moreover, the projected area ratio of the projected area of the second carrier particles to the projected area of the first and second carrier particles (projected area of second carrier particles/projected area of first and second carrier particles) was calculated for each of the exhaust gas purifying catalysts and used as the abundance ratio of the second carrier particles.

<Correlation Coefficient of Catalyst Location>

Element mapping images were generated for rare earth and rhodium by carrying out energy dispersive X-ray analysis using the Tecnai Osiras scanning transmission electron microscope manufactured by FEI Company Japan Ltd. The locations of rare earth elements and rhodium in the carrier particles were compared, the elements were defined as being supported on the second carrier and in the case the locations coincided at a correlation coefficient of 65.0% or more, and were defined as not being supported on the carrier in the case the locations coincided at a correlation coefficient of less than 65.0%.

<Changes in Particle Diameter of Catalyst Particles>

The exhaust gas purifying catalysts after durability testing as described above were analyzed with an X-ray diffractometer to analyze the particle diameter of precious metal catalyst particles. Particle diameter was calculated from Scherrer's equation using diffraction peak half width values of 2θ=41.1° for rhodium, 2θ=40.1° for palladium and 2θ=39.8° for platinum. On the basis of these results, the percentage change in precious metal particle diameter resulting from the addition of carboxylic acid was calculated for Examples 1 to 4 and 7 to 19 and Comparative Examples 1 to 2 and 6 to 9 based on Comparative Example 3 in which carboxylic acid was not added. The percentage change in precious metal particle diameter was calculated for Examples 5 and 6 based on Comparative Examples 4 and 5, respectively. In Table 1, a "−" symbol indicates a decrease in particle diameter, while a "+" symbol indicates an increase in particle diameter.

<50% $NO_x$ Purification Temperature>

The exhaust gas purification devices after durability testing were arranged in a normal pressure, fixed bed, continuous flow reactor followed by raising the temperature from 100° C. to 500° C. at the rate of 12° C./min while allowing a stoichiometrically equivalent model gas to flow there through and continuously measuring $NO_x$ purification rate during that time. The temperature at which 50% of the exhaust gas was purified was investigated for each sample.

<STEM-EDX Imaging>

Images of element mapping were captured for Example 3 and Comparative Example 3 by energy dispersive X-ray analysis using a scanning transmission electron microscope.

<<Results>>

The results of the aforementioned evaluations are shown in Tables 1 to 4. In addition, STEM-EDX images of Example 3 and Comparative Example 3 are shown in FIG. 2.

TABLE 1

| | | Examples | | | | Comparative Examples | | |
|---|---|---|---|---|---|---|---|---|
| | | 1 | 2 | 3 | 4 | 1 | 2 | 3 |
| Composition of carrier particles used in production (wt %) | $ZrO_2$ | 70 | 70 | 70 | 70 | 70 | 70 | 70 |
| | $CeO_2$ | 20 | 20 | 20 | 20 | 20 | 20 | 20 |
| | $La_2O_3$ | 3 | 3 | 3 | 3 | 3 | 3 | 3 |
| | $Nd_2O_3$ | 7 | 7 | 7 | 7 | 7 | 7 | 7 |
| | $Y_2O_3$ | 0 | 0 | 0 | 0 | 0 | 0 | 0 |
| | $Pr_6O_{10}$ | 0 | 0 | 0 | 0 | 0 | 0 | 0 |
| Precious metal catalyst | Type | Rh | Rh | Rh | Rh | Rh | Rh | Rh |
| Acid | Type | Acetic acid | Propionic acid | Oxalic Acid | Tartaric Acid | Benzene sulfonic acid | Nitric Acid | — |
| | Amount [mol/mol-Ln] | 3 | 3 | 1.5 | 1.5 | 1.5 | 3 | 0 |
| | Reaction equivalence point magnification factor | 1.00 | 1.00 | 1.00 | 1.00 | 1.00 | 1.00 | 0 |
| First carrier mean particle diameter | [μm] | 30 | 30 | 30 | 30 | 30 | 30 | 30 |
| Second carrier mean particle diameter | [μm] | 1.8 | 1.8 | 1.9 | 1.9 | 0.2 | 0.2 | 0 |
| Second carrier abundance ratio | [%] | 7.0 | 7.0 | 6.4 | 6.7 | 12.9 | 3.2 | 0.0 |
| Catalyst location correlation coefficient | [%] | 70 | 70 | 85 | 80 | 12.5 | 15 | 22.5 |
| Change in catalyst particle diameter | [%] | −6.1 | −6.1 | −15.9 | −11.4 | 24.7 | 24.0 | Reference |
| 50% $NO_x$ purification temperature | [° C.] | 273 | 271 | 262 | 263 | 301 | 295 | 284 |

TABLE 2

| | | Examples | | Comparative Examples | |
|---|---|---|---|---|---|
| | | 5 | 6 | 4 | 5 |
| Composition of carrier particles used in production (wt %) | $ZrO_2$ | 60 | 60 | 60 | 60 |
| | $CeO_2$ | 30 | 30 | 30 | 30 |
| | $La_2O_3$ | 5 | 5 | 5 | 5 |
| | $Nd_2O_3$ | 5 | 5 | 5 | 5 |
| | $Y_2O_3$ | 0 | 0 | 0 | 0 |
| | $Pr_6O_{10}$ | 0 | 0 | 0 | 0 |
| Precious metal catalyst | Type | Pd | Pt | Pd | Pt |
| Acid | Type | Propionic acid | Propionic acid | — | — |
| | Amount [mol/mol-Ln] | 3 | 3 | 0 | 0 |

TABLE 2-continued

|  |  | Examples | | Comparative Examples | |
|---|---|---|---|---|---|
|  |  | 5 | 6 | 4 | 5 |
|  | Reaction equivalence point magnification factor | 1.00 | 1.00 | 0.00 | 0.00 |
| First carrier mean particle diameter | [μm] | 25 | 25 | 25 | 25 |
| Second carrier mean particle diameter | [μm] | 1.9 | 1.5 | 0 | 0 |
| Second carrier abundance ratio | [%] | 7.3 | 5.4 | 0.0 | 0.0 |
| Catalyst location correlation coefficient | [%] | 72.5 | 67.5 | 30 | 25 |
| Change in catalyst particle diameter | [%] | −8.1 | −5.1 | Reference | Reference |
| 50% NOx purification temperature | [° C.] | 300 | 342 | 316 | 359 |

TABLE 3

|  |  | Examples | | | | | | | | |
|---|---|---|---|---|---|---|---|---|---|---|
|  |  | 7 | 8 | 9 | 10 | 11 | 12 | 13 | 14 | 15 |
| Composition of carrier particles used in production (wt %) | $ZrO_2$ | 65 | 65 | 65 | 65 | 65 | 65 | 65 | 65 | 65 |
|  | $CeO_2$ | 25 | 25 | 25 | 25 | 25 | 25 | 25 | 25 | 25 |
|  | $La_2O_3$ | 4 | 4 | 4 | 4 | 4 | 4 | 4 | 4 | 4 |
|  | $Nd_2O_3$ | 6 | 6 | 6 | 6 | 6 | 6 | 6 | 6 | 6 |
|  | $Y_2O_3$ | 0 | 0 | 0 | 0 | 0 | 0 | 0 | 0 | 0 |
|  | $Pr_6O_{10}$ | 0 | 0 | 0 | 0 | 0 | 0 | 0 | 0 | 0 |
| Precious metal catalyst | Type | | | | | Rh | | | | |
| Acid | Type | | | | | Tartaric acid | | | | |
|  | Amount [mol/mol-Ln] | 0.5 | 1 | 1.5 | 2 | 3 | 4 | 5 | 6 | 12 |
|  | Reaction equivalence point magnification factor | 0.50 | 0.67 | 1.00 | 1.33 | 2.00 | 2.67 | 3.33 | 4.00 | 8.00 |
| First carrier mean particle diameter | [μm] | 30 | 30 | 30 | 30 | 30 | 30 | 30 | 30 | 30 |
| Second carrier mean particle diameter | [μm] | 0.6 | 1.7 | 2 | 2.3 | 3.7 | 4.3 | 4.9 | 6.9 | 10 |
| Second carrier abundance ratio | [%] | 1.3 | 5.0 | 6.4 | 8.1 | 8.8 | 9.1 | 9.8 | 12.1 | 12.6 |
| Catalyst location correlation coefficient | [%] | 65 | 72.5 | 75 | 85 | 87.5 | 82.5 | 70 | 65 | 65 |
| Change in catalyst particle diameter | [%] | −3.2 | −6.8 | −11.2 | −15.4 | −22.6 | −13.8 | −5.8 | −0.1 | 0 |
| 50% $NO_x$ purification temperature | [° C.] | 274 | 269 | 268 | 264 | 261 | 265 | 270 | 283 | 286 |

TABLE 4

|  |  | Examples | | | | Comparative Examples | | | |
|---|---|---|---|---|---|---|---|---|---|
|  |  | 16 | 17 | 18 | 19 | 6 | 7 | 8 | 9 |
| Composition of carrier particles used in production (wt %) | $ZrO_2$ | 57 | 57 | 57 | 60 | 60 | 100 | 0 | 60 |
|  | $CeO_2$ | 29 | 29 | 24 | 0 | 40 | 0 | 100 | 0 |
|  | $Al_2O_3$ | 0 | 0 | 0 | 30 | 0 | 0 | 0 | 30 |
|  | $La_2O_3$ | 6 | 15 | 6 | 4 | 0 | 0 | 0 | 4 |
|  | $Nd_2O_3$ | 3 | 0 | 3 | 2 | 0 | 0 | 0 | 2 |
|  | $Y_2O_3$ | 6 | 0 | 6 | 4 | 0 | 0 | 0 | 4 |
|  | $Pr_6O_{10}$ | 0 | 0 | 5 | 0 | 0 | 0 | 0 | 0 |
| Precious metal catalyst | Type | Rh | Rh | Rh | Rh | Rh | Rh | Rh | Rh |

TABLE 4-continued

|  |  | Examples | | | | Comparative Examples | | | |
|---|---|---|---|---|---|---|---|---|---|
|  |  | 16 | 17 | 18 | 19 | 6 | 7 | 8 | 9 |
| Acid | Type | Acetic acid | Acetic acid | Acetic acid | Oxalic acid | Acetic acid | Acetic acid | Acetic acid | — |
|  | Amount [mol] | 3 | 3 | 3 | 1.5 | 3 | 3 | 3 | 0 |
|  | Reaction equivalence point magnification factor | 1.00 | 1.00 | 1.00 | 1 | — | — | — | — |
| First carrier mean particle diameter | [μm] | 25 | 25 | 25 | 25 | 25 | 25 | 25 | 25 |
| Second carrier mean particle diameter | [%] | 2.4 | 2.1 | 2.2 | 2.5 | — | — | — | — |
| Second carrier abundance ratio | [%] | 6.2 | 9.2 | 5.7 | 6.5 | — | — | — | — |
| Catalyst location correlation coefficient | [%] | 75 | 72.5 | 77.5 | 75 | — | — | — | 15 |
| Change in catalyst particle diameter | [%] | −8 | −6.9 | −9.3 | −13.5 | 3.2 | 27.3 | 32.7 | Reference |
| 50% $NO_x$ purification temperature | [° C.] | 263 | 267 | 264 | 257 | 297 | 304 | 313 | 280 |

As can be understood from Table 1, second carrier particles having a suitable mean particle diameter were easily obtained in the case of using an organic carboxylic acid (Examples 1 to 4). In looking at Comparative Examples 1 and 2, although the second carrier particles per se were determined to have been formed, the particle diameter thereof was extremely small, and in this case, as can be judged from the correlation coefficient, catalyst particles were not substantially supported on the second carrier particles. This is thought to be due to the precious metal catalyst particles also being supported on the first carrier particles due to the small size of the second carrier particles, thereby causing the precious metal catalyst particles to undergo sintering.

In addition, the diameter of the precious metal catalyst particles can be seen to have decreased after durability testing in the case of using an organic carboxylic acid (Examples 1 to 4). In the case of using benzenesulfonic acid or nitric acid instead of an organic carboxylic acid (Comparative Examples 1 and 2), the size of the precious metal catalyst particles increased in comparison with the case of not using acid (Comparative Example 3). Moreover, the 50% $NO_x$ purification temperature was extremely low in the case of Examples 1 to 4.

As can be understood from Tables 2 and 4, these trends were similarly observed even in the case of changing the composition of the starting carrier particles and type of precious metal.

In looking at Table 3, the particle diameter of the second carrier particles can be understood to increase when the added amount of organic carboxylic acid was increased. However, the diameter of the precious metal catalyst particles can be seen to decrease when the amount of organic carboxylic acid was increased. The 50% $NO_x$ purification temperature also changed in correspondence therewith.

In looking at the results of element mapping of the exhaust gas purification catalyst of Comparative Example 3 shown in FIG. 2, the distribution of the abundance ratios of each element can be understood to be uniform. In contrast, in looking at the results of element mapping of Example 3, the abundance ratios of cerium (Ce) and neodymium (Ne) can be seen to be extremely high at those locations where the abundance ratio of zirconium (Zr) is low, and these locations can be understood to be the locations of the second carrier particles. In addition, the abundance ratio of rhodium (Rh) can be seen to be high at the locations of the second carrier particles, thereby demonstrating that the precious metal catalyst particles are intensively supported on the second carrier particles.

B. Testing of Exhaust Gas Purification Device of Present Invention

<<Preparation of Catalyst>>

<Catalyst A>

Oxalic acid in amount twice the amount that reacts neither in excess or deficiently relative to sum of the rare earth element other than cerium contained in the carrier particles was dissolved in ion exchange water to prepare an oxalic acid solution. Next, rhodium nitrate solution was added to the oxalic acid solution to obtain an aqueous solution containing oxalic acid and rhodium nitrate. A dispersion obtained by dispersing carrier particles containing 20% by weight of ceria, 70% by weight of zirconia and 10% by weight of a rare earth oxide other than ceria in ion exchange water was then mixed with the aqueous solution containing oxalic acid and rhodium nitrate. This mixture was then stirred and dried for 8 hours at 110° C. followed by firing for 1 hour at 500° C. and crushing to obtain Exhaust Gas Purifying Catalyst A.

<Catalyst B>

Exhaust Gas Purifying Catalyst B was prepared in the same manner as Catalyst A with the exception of using carrier particles containing 40% by weight of ceria, 50% by weight of zirconia and 10% by weight of a rare earth oxide other than ceria.

<Catalyst C>

Exhaust Gas Purifying Catalyst C was prepared in the same manner as Catalyst A with the exception of using carrier particles containing 50% by weight of ceria, 40% by weight of zirconia and 10% by weight of a rare earth oxide other than ceria.

<Catalyst D>

Exhaust Gas Purifying Catalyst D was prepared in the same manner as Catalyst A with the exception of not using oxalic acid.

<Catalyst E>

Exhaust Gas Purifying Catalyst E was prepared in the same manner as Catalyst B with the exception of not using oxalic acid.

<Catalyst F>

Exhaust Gas Purifying Catalyst F was prepared in the same manner as Catalyst C with the exception of not using oxalic acid.

<<Preparation of Exhaust Gas Purification Device>>

Example 20

A slurry obtained by mixing 40 g of alumina, palladium nitrate (0.1 g as palladium), 40 g of the aforementioned ceria-zirconia oxide (ceria content: 40% by weight) and 100 g of ion exchange water was coated onto a ceramic honeycomb substrate (square cells, 2.5 mil/900 cpsi, φ93×L105). The coated substrate was then dried for 1 hour at 250° C. and then fired for 1 hour at 500° C. to obtain a substrate having a lower layer. Next, a slurry obtained by mixing 10 g of alumina, 30 g of Catalyst A and 100 g of ion exchange water was coated onto the lower layer followed by firing in the same manner to form an intermediate layer. A slurry obtained by mixing 30 g of alumina, palladium nitrate (1.0 as palladium), 50 g of the aforementioned Catalyst A and 100 g of ion exchange water was coated onto the intermediate layer. This was then fired in the same manner to obtain the exhaust gas purification device of Example 20 using this slurry to form the upper layer. This exhaust gas purification device had 16 g (40 g×0.4) of ceria (OSC material) in the lower layer, 6 g (30 g×0.2) in the intermediate layer and 10 g (50 g×0.2) in the upper layer.

Example 21

The exhaust gas purification device of Example 21 was obtained in the same manner as Example 20 with the exception of changing Catalyst A used when forming the upper layer to Catalyst E.

Example 22

The exhaust gas purification device of Example 22 was obtained in the same manner as Example 20 with the exception of changing Catalyst A used when forming the upper layer to Catalyst B.

Example 23

The exhaust gas purification device of Example 23 was obtained in the same manner as Example 20 with the exception of changing Catalyst A used when forming the intermediate layer to Catalyst B and changing Catalyst A used when forming the upper layer to Catalyst D.

Comparative Example 10

The exhaust gas purification device of Comparative Example 10 was obtained in the same manner as Example 20 with the exception of changing Catalyst A used when forming the intermediate layer and upper layer to Catalyst D.

Comparative Example 11

The exhaust gas purification device of Comparative Example 11 was obtained in the same manner as Comparative Example 10 with the exception of changing Catalyst D used when forming the upper layer to Catalyst E.

Comparative Example 12

The exhaust gas purification device of Comparative Example 12 was obtained in the same manner as Comparative Example 10 with the exception of changing Catalyst D used when forming the upper layer to Catalyst F.

Comparative Example 13

The exhaust gas purification device of Comparative Example 13 was obtained in the same manner as Comparative Example 10 with the exception of changing Catalyst D used when forming the upper layer to Catalyst E.

Reference Example 1

The exhaust gas purification device of Reference Example 1 was obtained in the same manner as Example 20 with the exception of changing Catalyst A used when forming the upper layer to Catalyst C.

<Exhaust Gas Purification Devices after Durability Testing>

The aforementioned exhaust gas purification devices of Examples 20 to 23, Comparative Examples 10 to 13 and Reference Example 1 were installed in an engine and subjected to durability treatment for 50 hours at a catalyst bed temperature of 950° C.

<<Evaluation Methods>>
<Abundance Ratio of Second Carrier>

The abundance ratios of the second carriers of Catalysts A to F were evaluated in the same manner as the aforementioned Experiment A.

<Correlation Coefficient of Catalyst Location>

Correlation coefficients of catalyst location were evaluated in the same manner as the aforementioned Experiment A.

<Exhaust Gas Purification Performance>

Each of the exhaust gas purification devices following durability treatment was installed in an actual vehicle having an engine displacement of 0.7 L followed by measurement of NOx emission level per kilometer traveled in compliance with the JC08C mode and JC08H mode. Here, the level of NOx emitted for 3 seconds immediately after air-fuel ratio returned to the stoichiometric value after fuel was cutoff and idling was discontinued was evaluated as the restart NOx emission level. In addition, the level of NOx emitted during the 11$^{th}$ peak of the JC08 HOT mode was evaluated as the high SV NOx emission level. Moreover, the level of NOx emitted when driving in the JC08 HOT mode was also evaluated.

<<Results>>

The results of the aforementioned evaluations are shown in Table 5.

TABLE 5

| | | Examples | | | | Comparative Examples | | | | Reference Example |
|---|---|---|---|---|---|---|---|---|---|---|
| | | 20 | 21 | 22 | 23 | 10 | 11 | 12 | 13 | 1 |
| Upper Layer | Type of Catalyst | A | E | B | D | D | E | F | D | C |
| | Ceria ratio in catalyst | 20 | 40 | 40 | 20 | 20 | 40 | 50 | 20 | 50 |
| | Second carrier abundance ratio | 0.0526 | 0 | 0.0753 | 0 | 0 | 0 | 0 | 0 | 0.0870 |
| Intermediate Layer | Type of Catalyst | A | A | A | B | D | D | D | E | A |
| | Ceria ratio (wt %) | 20 | 20 | 20 | 40 | 20 | 20 | 20 | 40 | 20 |
| | Second carrier abundance ratio | 0.0526 | 0.0526 | 0.0526 | 0.0753 | 0 | 0 | 0 | 0 | 0.0526 |
| Amount of ceria | | 32 | 42 | 42 | 38 | 32 | 42 | 47 | 38 | 47 |
| Correlation coefficient (%) | | 50 | 55 | 50 | 55 | 20 | 20 | 20 | 20 | 50 |
| Restart NOx emission level (mg/km) | | 0.63 | 0.77 | 0.62 | 1.09 | 1.02 | 1.09 | 1.43 | 1.31 | 1.38 |
| High SV NOx emission level (mg/km) | | 1.62 | 0.83 | 1.10 | 0.95 | 1.68 | 1.13 | 0.67 | 0.99 | 0.66 |
| JC08 Hot Mode NOx emission level (mg/km) | | 5.55 | 5.51 | 4.58 | 5.30 | 6.99 | 5.77 | 6.39 | 6.67 | 6.18 |

When Example 20 is compared with Comparative Example 10, the second carrier is present in Example 20 and restart NOx emission level can be decreased considerably. When Example 20 is compared with Example 21, although restart NOx emission level is lower than Example 21 since the carrier is present in the upper layer in Example 20, the ceria ratio in the upper layer of the catalyst is high in Example 21, thereby making it possible to lower high SV NOx emission level. Although high SV NOx emission levels are extremely low since catalysts having a high ceria ratio are used in Comparative Examples 11 to 13, restart NOx emission levels are high.

Since catalysts having a high ceria ratio and/or in which the second carrier is present are used in Examples 21 to 23, restart NOx emission levels, high SV NOx emission levels and JC08 Hot Mode NOx emission levels can be decreased. In Reference Example 1, although the second carrier is present in the upper layer, a catalyst having an even higher ceria ratio is used and high SV NOx emission level is extremely low, restart NOx emission level and JC08 Hot Mode NOx emission level were comparatively high.

REFERENCE SIGNS LIST

1 First carrier particle
1a Rare earth element-enriched area
2 Second carrier particle
3 Rhodium particle
10 Exhaust gas purifying catalyst
20 Upper layer
30 Lower layer
40 Substrate
100 Exhaust gas purification device

The invention claimed is:

1. An exhaust gas purifying catalyst having a first carrier particle, a second carrier particle, and a precious metal catalyst particle supported on the first carrier particle and the second carrier particle; wherein, the first carrier particle contains 3.0% by weight or more of ceria, 50% by weight to 95% by weight of zirconia and 1.0% by weight to less than 20% by weight of a rare earth oxide other than ceria, the second carrier particle contains 20% by weight to 60% by weight of a rare earth oxide other than ceria and optionally contains 0.0% by weight to 40% by weight of ceria and 0.0% by weight to 40% by weight of zirconia, the total content of ceria and zirconia of the first carrier particle is higher than the total content of ceria and zirconia of the second carrier particle, the content of the rare earth oxide other than ceria of the second carrier particle is higher than the content of the rare earth oxide other than ceria of the first carrier particle, the content of ceria of the first carrier particle is 45% by weight or less, and the precious metal catalyst particle comprises a rhodium particle.

2. The exhaust gas purifying catalyst according to claim 1, wherein the content of the rare earth oxide other than ceria of the first carrier particle is less than 20% by weight, and the content of the rare earth oxide other than ceria of the second carrier particle is 20% by weight or more.

3. The exhaust gas purifying catalyst according to claim 2, wherein, in the case of observing the first carrier particle and the second carrier particle with a scanning transmission electron microscope, the ratio of the projected area of the second carrier particle to the projected area of the first carrier particle (area of second carrier particle/area of first carrier particle) is within the range of 0.050 to 0.100.

4. The exhaust gas purifying catalyst according to claim 1, wherein the first carrier particle and the second carrier particle are ceria-zirconia solid solutions containing a rare earth oxide other than ceria, and the rare earth oxide other than ceria of the first carrier particle and the rare earth oxide other than ceria of the second carrier particle are oxides of at least one rare earth element selected from the group consisting of yttrium, lanthanum, praseodymium, neodymium and samarium.

5. The exhaust gas purifying catalyst according to claim 1, wherein the first carrier particle contains 50% by weight to 75% by weight of zirconia, 20% by weight to 40% by weight of ceria and 1.0% by weight to less than 20% by weight of a rare earth oxide other than ceria, and the second carrier particle contains 0.0% by weight to 40% by weight of zirconia, 25% by weight to 40% by weight of ceria, and 20% by weight to 60% by weight of a rare earth oxide other than ceria.

6. The exhaust gas purifying catalyst according to claim 1, wherein the mean particle diameters of the first carrier particle and the second carrier particle as measured with a scanning transmission electron microscope are 0.50 μm to 100 μm and 0.50 μm to 5 μm, respectively.

7. The exhaust gas purifying catalyst according to claim 1, wherein the precious metal catalyst particle further contains platinum particles and/or palladium particles.

8. The exhaust gas purifying catalyst according to claim 1, wherein the locations of the rhodium particle and the locations of the second carrier particle coincide at a correlation coefficient of 65.0% or more when element mapping has been carried out by energy dispersive X-ray analysis using a scanning transmission electron microscope, the correlation coefficient being calculated according to the following formula:

$$\frac{\sum_{i=1}^{n}(x_i - x_{av})(y_i - y_{av})}{\sqrt{\sum_{i=1}^{n}(x_i - x_{av})^2} \sqrt{\sum_{i=1}^{n}(y_i - y_{av})^2}} \times 100(\%) \quad [\text{Math. 1}]$$

(wherein, $x_i$ represents the characteristic X-ray intensity of a precious metal element at location i, $x_{av}$ represents the average value of the characteristic X-ray intensity of the precious metal element, $y_i$ represents the characteristics X-ray intensity of a rare earth metal element at location i, and $y_{av}$ represents the average value of the characteristic X-ray intensity of the rare earth metal element).

9. An exhaust gas purification device provided with a catalyst layer containing the exhaust gas purifying catalyst according to claim 1 and a substrate.

10. The exhaust gas purification device according to claim 9, wherein the catalyst layer contains and upper layer, composing at least a portion of the uppermost layer, and a lower layer, and the upper layer contains the exhaust gas purifying catalyst.

11. An exhaust gas purification device provided with a substrate containing the exhaust gas purifying catalyst according to claim 1.

12. A method for producing an exhaust gas purifying catalyst according to claim 1, comprising the following:

mixing an aqueous dispersion of a carrier particle, containing ceria, zirconia and a rare earth oxide other than ceria; an aqueous solution containing a salt of a catalyst precious metal comprising a rhodium; and an organic carboxylic acid, thereby eluting the rare earth oxide other than ceria from the carrier particle by the organic carboxylic acid to obtain a second carrier particle enriched with the rare earth oxide other than ceria and a first carrier particle enriched with ceria and zirconia, and supporting the catalyst precious metal on the second carrier particle to obtain an aqueous dispersion containing an unfired exhaust gas purifying catalyst and, drying and firing the aqueous dispersion containing the unfired exhaust gas purifying catalyst.

13. The method according to claim 12, wherein the metal oxide of the carrier particle is a ceria-zirconia solid solution, the rare earth oxide other than ceria of the carrier particle is an oxide of at least one rare earth element selected from the group consisting of yttrium, lanthanum, praseodymium, neodymium and samarium, and the salt of the catalyst precious metal is a nitrate or sulfate of platinum, palladium, rhodium or a combination thereof.

14. The method according to claim 12, wherein the organic carboxylic acid is an organic carboxylic acid having a molecular weight of 300 or less.

15. The method according to claim 12, wherein the molar ratio of the number of moles of the organic carboxylic acid to the total number of moles of rare earth element contained in the carrier particle (mol/mol-Ln) is 0.5 to 3.5.

\* \* \* \* \*